| United States Patent [19] | [11] Patent Number: 5,036,038 |
| Muan et al. | [45] Date of Patent: Jul. 30, 1991 |

[54] COMPOSITION INVOLVING NIO-$V_2O_3$TIO$_2$

[75] Inventors: Arnulf Muan, Lacey Spring, Va.; Mitri S. Najjar, Wappingers Falls, N.Y.

[73] Assignee: Texaco Inc., White Plains, N.Y.

[21] Appl. No.: 507,803

[22] Filed: Apr. 12, 1990

[51] Int. Cl.$^5$ .......................... B01J 21/00; B01J 23/74
[52] U.S. Cl. ...................................... 502/335; 502/247; 502/259; 502/324; 502/328; 502/337; 502/350; 502/351; 502/353; 502/354; 502/524; 501/94; 501/134
[58] Field of Search ............... 502/337, 350, 353, 524, 502/247, 259, 324, 328, 351, 335; 501/134, 94

[56] References Cited

U.S. PATENT DOCUMENTS

| 3,926,853 | 12/1975 | Senes et al. | 502/242 |
| 4,049,583 | 9/1977 | Lauder | 502/314 |
| 4,499,203 | 2/1985 | Toulhoat et al. | 502/337 |
| 4,742,037 | 5/1988 | Baiker et al. | 502/350 |
| 4,835,126 | 5/1989 | Wachs et al. | 502/350 |
| 4,977,130 | 12/1990 | Najjar et al. | 502/324 |

*Primary Examiner*—Anthony McFarlane
*Attorney, Agent, or Firm*—Robert A. Kulason; James J. O'Loughlin; Albert Brent

[57] ABSTRACT

The present invention pertains to novel solid solutions involving NiO, $V_2O_3$ and TiO$_2$ and the method for their preparation. The compositions involving NiO, $V_2O_3$ and TiO$_2$ fall within the shaded area of a polygon in a ternary composition diagram of NiO, $V_2O_3$ and TiO$_2$ as shown in the drawing herein e.g., FIG. 1. The composition may be used as an oxidation catalyst or in the manufacture of high temperature refractories.

14 Claims, 1 Drawing Sheet

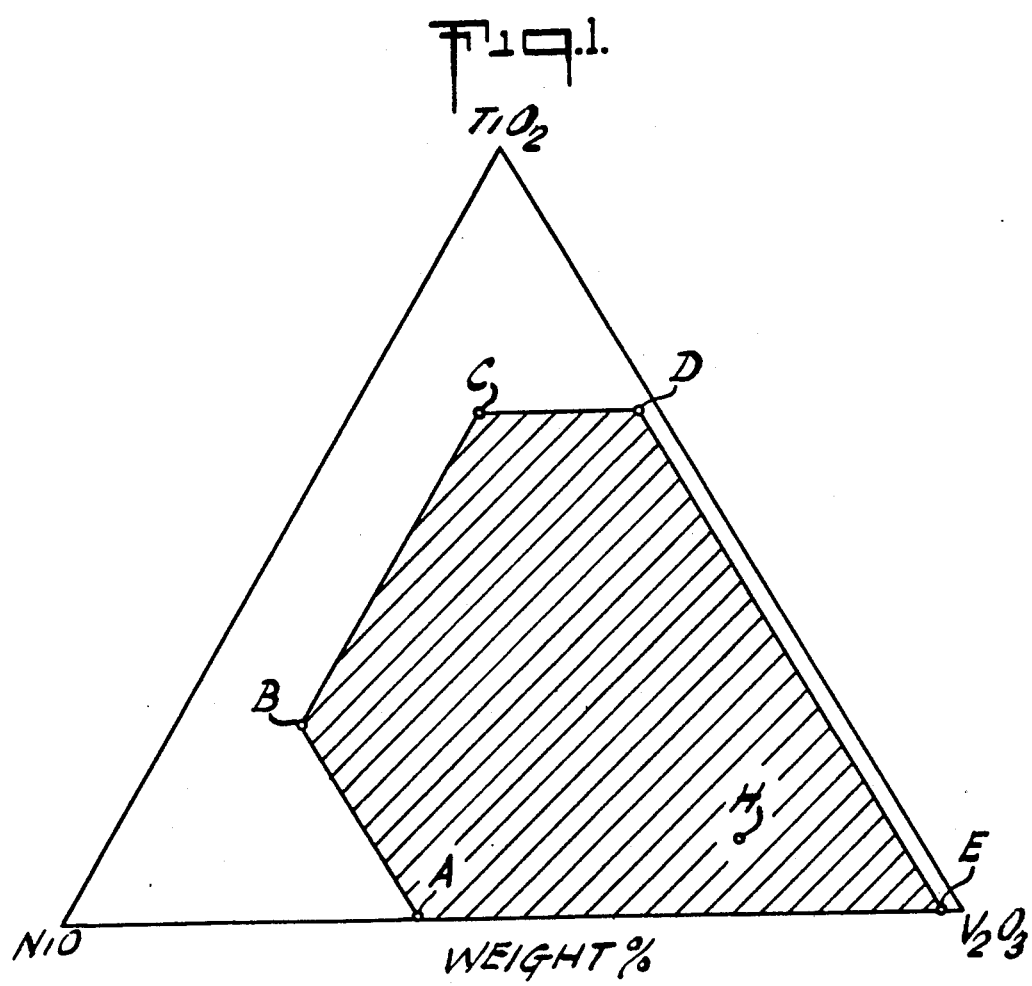

COMPOSITION INVOLVING NIO-V₂O₃TIO₂

BACKGROUND OF THE INVENTION

Field of the Invention

This invention relates to compositions involving $NiO$-$V_2O_3$-$TiO_2$.

SUMMARY OF THE INVENTION

The present invention pertains to novel solid solutions involving $NiO$, $V_2O_3$ and $TiO_2$ and the method for their preparation. The solid compositions involving $NiO$, $V_2O_3$ and $TiO_2$ fall within the shaded area of a polygon in a ternary composition diagram of $NiO$, $V_2O_3$ and $TiO_2$ as shown in the drawing herein e.g. FIG. 1. The polygon has the vertices and corresponding coordinates in weight percent as shown in the following Table I.

TABLE I

| Vertices | Coordinates (wt %) | | |
|---|---|---|---|
| | NiO | V₂O₃ | TiO₂ |
| A | 60 | 40 | 0 |
| B | 60 | 14 | 26 |
| C | 20 | 14 | 66 |
| D | 2 | 32 | 66 |
| E | 2 | 98 | 0 |

The compositions involving $NiO$, $V_2O_3$ and $TiO_2$ are depicted by the shaded area circumscribed by ABCDE as shown in FIG.1. These novel solid solutions involving nickel oxide, vanadium oxide, and $TiO_2$ are made by the process involving the steps of:

(1) heating $V_2O_5$ powder having a particle size of less than about 50 microns in an atmosphere in which the partial pressure of oxygen is in the range of $10^{-8}$ to $10^{-10}$ atmosphere while gradually increasing the temperature over a temperature range of about 600° C. to 1300° C., and holding the temperature at about 1300° C. for a period to ensure complete reduction of all vanadium to $V^{3+}$;

(2) heating $TiO_2$ and $NiO$ powders each having a particle size of less than about 50 microns for a period of about 10 to 14 hrs. at a temperature in the range of about 600° C. to 800° C. for $TiO_2$ and about 700° C. to 1000° C. for $NiO$;

(3) thoroughly grinding together about 14 to 98 wt. % of $V_2O_3$ from (1), with about 0 to 66 wt. % of $TiO_2$ and about 2 to 60 wt. % of $NiO$ from (2) to produce a mixture having a grain size of less than about 50 microns, (4) pelletizing the mixture from (3) at a pressure of about 5,000 psi; and (5) heating and reacting together the pellets from (4) at a temperature in the range of about 900° C. to 1600° C. for a period in the range of about ½ to 48 hrs., in an atmosphere in which the partial pressure of oxygen is in the range of $10^{-8}$ to $10^{-3}$ atmosphere to produce said compositions involving $NiO$, $V_2O_3$ and $TiO_2$.

In one embodiment, the pellets from step (5) are cooled to ambient temperature while at substantially the same partial pressure of oxygen as in step (5). Preferably, to prevent undue oxidation and moisture pickup, the cooled pellets are stored in a sealed container.

BRIEF DESCRIPTION OF THE DRAWING

The drawing e.g. FIG. 1 depicts a ternary composition diagram showing a polygon shaped shaded area circumscribed by ABCDE within which useful compositions involving $NiO$-$V_2O_3$-$TiO_2$ are found.

DESCRIPTION OF THE INVENTION

New solid solutions have been synthesized by the subject invention in which the nature and extent of the formation of solid solutions involving $NiO$, $V_2O_3$ and $TiO_2$ have been characterized. This work has led to synthesizing new phases in which vanadium in several oxidation states are accommodated such as to render crystalline phases thermodynamically stable over a wide range of oxygen pressures at elevated temperatures.

The newly synthesized solid compositions involving $NiO$-$V_2O_3$-$TiO_2$ are shown in the enclosed FIGURE (drawing) as circumscribed by the polygon shaped shaded area ABCDE in the ternary composition diagram. The oxidation states of vanadium in the solid solutions are mainly +3 and +4.

The polygon shaped shaded area ABCDE has the following vertices and corresponding coordinates in weight

| Vertices | Coordinates (wt %) | | |
|---|---|---|---|
| | NiO | V₂O₃ | TiO₂ |
| A | 60 | 40 | 0 |
| B | 60 | 14 | 26 |
| C | 20 | 14 | 66 |
| D | 2 | 32 | 66 |
| E | 2 | 98 | 0 |

A typical newly synthesized material comprising a spinel having the formula $Ni_{1.05} V_{1.54} Ti_{0.32} O_{4.0}$ sesquioxide having the formula $Ni_{0.19} V_{1.38} Ti_{0.37} O_{3.0}$ is illustrated by point H in the drawing having the following coordinates in wt. %: $NiO$ 20, $V_2O_3$ 70, and $TiO_2$ 10.

The subject compositions made from $NiO$, $V_2O_3$ and $TiO_2$ are synthesized in the following manner. The identity of the reaction product, solid solutions involving $NiO$-$V_2O_3$-$TiO_2$, may be confirmed by X-ray diffraction analysis.

First, $V_2O_3$ is prepared by heating commercially available analytical-grade $V_2O_5$ having a particle size of less than about 50 microns in a vertical tube furnace in an atmosphere of carefully selected oxygen pressure within the stability range of $V_2O_3$ e.g. in the range of $10^{-8}$ to $10^{31\ 10}$ atmospheres. This is accomplished by using a gas mixture of high-purity e.g. 99.9 mole % or more $CO_2$ and $H_2$ or $CO_2$ and $CO$ or $H_2O$ and $H_2$ in controlled proportions. The $CO_2/H_2$, $CO_2/CO$ or $H_2O/H_2$ ratio by volume is in the range of 10/1 to 1/1. The relatively low melting point of the starting vanadium oxide ($V_2O_5$) e.g. about 690° C., necessitates heating the oxide slowly. Starting at a temperature of about 600° C., the temperature is gradually increased over a period of about 12 to 24 hrs. to a final temperature of about 1300° C. At a temperature of about 1300° C. the vanadium oxide is held at least about 24 hrs. e.g. 24 to 30 hrs., to ensure complete reduction of all vanadium to $V^{3+}$.

Preheated analytical-grade oxides having a particle size of less than about 50 microns are used as starting materials for the other components of the solid solutions to be synthesized. For example, $TiO_2$ is heated for about 10 to 14 hrs. at a temperature in the range of about 600° C. to 800° C. and NiO is heated for about 10 to 14 hrs. at a temperature in the range of about 700° C. to 1000° C. prior to being used in preparation of the final mixtures. The oxides are thereby demoisturized. They may be then cooled to ambient conditions.

The mixtures of the three oxide components are thoroughly mechanically ground together under acetone in an agate mortar to ensure thorough mixing and a sufficiently small grain size e.g. less than 50 microns. For example, about 14 to 98 wt. % of $V_2O_3$ is ground together with about 0 to 66 wt. % of $TiO_2$ and about 2 to 60 wt. % of $NiO_2$ to produce a mixture having a grain size of less than about 50 microns. Complete formation of the desired compounds in the succeeding heat treatment is thereby promoted. Next, the oxide mixtures are pelletized at a pressure of about 5,000 psi or higher. The pellets may have any conventional size e.g. 1/16" to 1". The pellets are then heated and reacted together at a temperature in the range of about 900° C. to 1600° C., such as about 1100° C. to 1200° C., for a period in the range of about ½ to 48 hrs., such as about ½ to 2 hrs. or 12 to 48 hrs. (depending on the nature and solidus temperature of the phase to be synthesized) in a vertical tube furnace with carefully controlled oxygen pressures, in the range of $10^{-8}$ to $10^{-3}$ atmosphere. In the manner described previously for preparing $V_2O_3$, the pellets are heated in a furnace atmosphere provided by a gas mixture of $CO_2$ and $H_2$ or $CO_2$ and CO or $H_2O$ and $H_2$ in various desired volumetric mixing ratios. For example, the volumetric ratio $CO_2/H_2$, $CO_2/CO$, or $H_2O/H_2$ is typically in the range of about 50/1 to 10/1. These selected ratios are kept constant for the duration of the synthesis by use of a differential manometer. By this method the oxygen pressure at the specified temperature can be controlled to better than ±1%. The thermodynamic data for the water-gas shift reaction ($CO_2 + H_2 = CO + H_2O$), on which the calculations were based, are known with extremely high accuracy (better than 0.1%). Hence, the method used herein ensures reliable accurate control of the oxidation state of vanadium during the synthesis. This is extremely important for optimization of the properties of the finished product.

At the time of the high temperature reaction in the range of about 900° C. to 1600° C., all of the oxide pellets may be in the solid state or at least one, two or three of the oxide constituents may be in the molten state. At the reaction conditions prevailing in the subject process, solid solutions may be made by solid-state reactions considerably below temperatures at which a liquid phase is present. However, the presence of a liquid phase or a solid-liquid phase improves the kinetics of the reaction.

The individual oxide components are heated to a sufficiently high temperature to expel absorbed or adsorbed water. Well defined starting materials for accurately weighing up mixtures is thereby produced. $V_2O_5$ was heated slowly in several steps to a temperature of about 600° C. to 1300° C., such as about 1100° C. to 1300° C. at controlled oxygen pressures in order to preferably decompose the $V_2O_5$ slowly to $V_2O_3$. By this means, violent reactions are avoided at the highest temperatures, and most of the vanadium is produced in the desired oxidation state $V^{3+}$.

The oxide mixtures, were heated at temperatures in the range of about 900° C.–1600° C. in order to promote reaction among the oxide components to the desired finished products consisting mainly of one or more (solid-solution) phases. In one embodiment, the mixture of solid particles was heated to a temperature below the solidus, for example to about 1200° C. The phase assemblage of the final product was produced entirely by solid state reaction. Under such conditions, the crystals were relatively small, typically, of about 0.5–3.0 microns. In another embodiment, the mixtures were heated to a sufficiently high temperature e.g. about 1600° C. to produce partial or complete melting. This speeds up the reaction and produces (solid solution) phases (crystals) of larger size, typically in the range of about 2–100 microns. After heating the mixtures at this high temperature for a period of time, such as ½–2 hrs., the composition is cooled to ambient conditions. For example, the composition may be cooled slowly (over a period of ½–1 hr) to about 1200° C. From this temperature, the composition may be cooled rapidly (quenched) to room temperature. During these runs the oxygen pressure of the gas phase was controlled by using gas mixtures of $CO_2$ and $H_2$, $CO_2$ and CO, or $H_2O$ and $H_2$ with volumetric ratios $CO_2/H_2$, $CO_2/CO$ or $H_2O/H_2$ in the range of about 50/1–10/1.

In addition to oxygen pressure, one other parameter influencing the oxidation state of vanadium in oxide phases has been utilized in synthesizing the new phases. This is the provision of host structures which incorporate vanadium in one (or more) valence state(s) in strong preference to other valence states. In the present case, the extensive ternary solid-solution phases (spinel, sesquioxide, pseudobrookite, and mixtures thereof) in the system $NiO$-$V_2O_3$-$TiO_2$ serves this purpose. In these solid solutions, the vanadium is stabilized in the trivalent state, in the sesquioxide structure, and in the tetravalent state in the spinel and pseudobrookite phases, by preferential substitution of $V^{4+}$ for $Ti^{4+}$. Furthermore, NiO in combination with vanadium oxide stabilizes $V^{5+}$ in the crystalline phase $Ni_3V_2O_{12}$ by virtue of the fact that NiO is a base relative to $V_2O_5$.

At subsolidus temperatures, this system is dominated by the spinel ($NiV_2O_4$-$Ni_2TiO_4$), sesquioxide ($V_2O_3$-$NiTiO_3$), and pseudobrookite ($NiTi_2O_5$-$V_2TiO_5$) solid solutions. The spinel solid solution is complete between the two end members at high temperatures (>1400° C.); whereas, the latter two solid solutions (sesquioxide and pseudobrookite) extend for most of the composition ranges between $NiTiO_3$ and $V_2O_3$, or $NiTi_2O_5$-$V_2TiO_5$, respectively. The distribution of vanadium among the phases spinel, sesquioxide and pseudobrookite is sensitive to variations in oxygen pressure. Hence, this distribution will give important information on crystalchemical and energetic aspects of the substitution of vanadium in its various oxidation states, especialy in the spinel phase.

The pellets of the composition involving $NiO$-$V_2O_3$-$TiO_2$ may be used as an oxidation catalyst, offering improved activity and yields and greater stability over a wider temperature range e.g. about 1000° C. or higher than that which is offered by typical oxidation catalysts. For example, as an oxidation catalyst the subject pellets may be used in the conversion of o-xylene to phthalic anhydride, butane to maleic anhydride, or alcohols to aldehydes or organic acids.

As a high temperature refractory or as an ingredient in a high temperature refractory material for lining a gasifier for the partial oxidation of ash-containing liquid hydrocarbonaceous and solid carbonaceous fuels, the subject material would have a long life, withstanding attack from $V_2O_5$. For example, a thermal refractory for lining the reaction zone of a partial oxidation gas generator may comprise the previously described composition involving $NiO$-$V_2O_3$-$TiO_2$ in the amount of about 1 to 25 wt. %, and the remainder of the refractory e.g. about 75 to 99 wt. % involving oxides with a cationic portion that is selected from the group consisting of Cr, Mg, Al, Mn, Si and mixtures thereof. The partial oxidation reactor operates in a reducing atmosphere and at a temperature in the range of about 1700° F. to 3000° F.

The subject composition involving $NiO$-$V_2O_3$-$TiO_2$ may also be used as an additive. About 0.01 to 0.2 wt. % (basis weight of ash in the fuel fed to the gas generator) of additive may be introduced into the refractory lined partial oxidation gas generator to stabilize said refractory.

Various modifications of the invention as herein before set forth may be made without departing from the spirit and scope thereof, and therefore, only such limitations should be made as are indicated in the appended claims.

We claim:

1. A method of preparing compositions from NiO, $V_2O_3$ and $TiO_2$ wherein said compositions fall within the shaded area circumscribed by ABCDE as shown in the disclosed FIGURE, and wherein said method comprises the steps of:
   (1) heating $V_2O_5$ powder having a particle size of less than about 50 microns in an atmosphere in which the partial pressure of oxygen is in the range of $10^{-8}$ to $10^{-10}$ atmospheres while starting at a temperature of 600° C. and gradually increasing the temperature over a period in the range of about 12 to 24 hours to about 1300° C. and holding the temperature at about 1300° C. for a period to ensure complete reduction of all vanadium to $V^{3+}$;
   (2) separately heating $TiO_2$ and NiO powders each having a particle size of less than about 50 microns for a period of about 600° C. to 800° C. for $TiO_2$ and about 700° C. to 1000° C. for NiO;
   (3) thoroughly grinding together about 14 to 98 wt. % of $V_2O_3$ from (1), with about 0 to 66 wt. % of $TiO_2$ and about 2 to 60 wt. % of NiO from (2) to produce a mixture having a grain size of less than about 50 microns;
   (4) pelletizing the mixture from (3) at a pressure of about 5,000 psi; and
   (5) heating and reacting together the pellets from (4) at a temperature in the range of about 900° C. to 1600° C. for a period in the range of about ½ to 48 hrs. in an atmosphere in which the partial pressure of oxygen is in the range of $10^{-8}$ to $10^{-3}$ atmosphere.

2. The method of claim 1 wherein in said FIGURE the amounts of NiO, $V_2O_3$ and $TiO_2$ are characterized as shown in the Table below;

| Vertices | Coordinates (wt %) | | |
|---|---|---|---|
| | NiO | $V_2O_3$ | $TiO_2$ |
| A | 60 | 40 | 0 |
| B | 60 | 14 | 26 |
| C | 20 | 14 | 66 |
| D | 2 | 32 | 66 |
| E | 2 | 98 | 0 |

3. The method of claim 1 further comprising cooling the pellets from (5) to ambient temperature, while at substantially the same partial pressure of oxygen as in (5); and storing the cooled pellets in a sealed container.

4. The method of claim 1 wherein said compositions are solid solutions.

5. The method of claim 1 wherein at the time of reaction in (5) all of the oxide pellets are in the solid state or at least one, two or three of the oxide constituents are in the molten state.

6. The method of claim 1 wherein in step (11) said $V_2O_5$ powder is heated in an atmosphere involving a gas mixture of $CO_2$ and $H_2$ with a volume ratio of $CO_2/H_2$ in the range of about 50/1 to 10/1.

7. The method of claim 1 where in step (5) said pellets are heated in an atmosphere comprising a gas mixture of $CO_2$ and $H_2$ with a volume ratio of $CO_2H_2$ in the range of about 50/1 to 10/1.

8. The method of claim 1 where in steps (1) and (5) said materials are heated in an atmosphere comprising a gas mixture of $CO_2$ and CO or $H_2O$ and $H_2$ in volumetric ratios $CO_2/CO$ or $H_2O/H_2$ in the range of about 50/1 to 10/1.

9. The method of claim 1 wherein said composition comprises a spinel having the formula $Ni_{1.05}V_{1.54}Ti_{0.32}O_{4.0}$ and sesquioxide having the formula $Ni_{0.19}V_{1.38}Ti_{0.37}O_{3.0}$ as illustrated by point H in said disclosed FIGURE and having the following coordinates in wt. %: NiO 20, $V_2O_3$ 70, and $TiO_2$ 10.

10. The method of claim 12 wherein said compositions have a structure selected from the group consisting of spinel, sesquioxide, pseudobrookite, and mixtures thereof.

11. Compositions produced from NiO, $V_2O_3$ and $TiO_2$, wherein said compositions are solid solutions and fall within the shaded area circumscribed by ABCDE as shown in the disclosed FIGURE wherein the amounts of NiO, $V_2O_3$ and $TiO_2$ are characterized as shown in the table below:

| Vertices | Coordinates (Wt %) | | |
|---|---|---|---|
| | NiO | $V_2O_3$ | $TiO_2$ |
| A | 60 | 40 | 0 |
| B | 60 | 14 | 26 |
| C | 20 | 14 | 66 |
| D | 2 | 32 | 66 |
| E | 2 | 98 | 0. |

12. A composition as provided in claim 2 comprising a spinel having the formula $Ni_{1.05}V_{1.54}Ti_{0.32}O_{4.0}$ and sesquioxide having the formula $Ni_{0.19}V_{1.38}Ti_{0.37}O_{3.0}$ as illustrated by point H in said disclosed FIGURE and having the following coordinates in wt. % NiO 20, $V_2O_3$ 70, and $TiO_2$ 10.

13. Compositions produce from NiO, $V_2O_3$, and $TiO_2$ and in which the vandalism is present in the trivalent and tetravalent states, and the structure is selected from the group consisting of spinel, sesquioxide, pseudobrookite, and mixtures thereof; wherein said compositions are characterized by their ability to catalyze oxidation reactions and which fall within the shaded area circumscribed by ABCDE as shown in the disclosed FIGURE wherein the amounts of NiO, $V_2O_3$ and $TiO_2$ are characterized as shown in the table below:

| Vertices | Coordinates (Wt %) | | |
|---|---|---|---|
| | NiO | $V_2O_3$ | $TiO_2$ |
| A | 60 | 40 | 0 |
| B | 60 | 14 | 26 |
| C | 20 | 14 | 66 |
| D | 2 | 32 | 66 |
| E | 2 | 98 | 0. |

14. Thermal refractory compositions comprising, (1) a solid solution in the amount of about 1-25 wt. %, and (2) at least one oxide having a cationic portion selected from the group consisting of Cr, Mg, Al, Mn, Si, and mixtures thereof; wherein said solid solution is produced from NiO, $V_2O_3$ and $TiO_2$ and has a composition that falls within the shaded area circumscribed by ABCDE as shown in the disclosed FIGURE wherein the amounts of NiO, $V_2O_3$ and $TiO_2$ are characterized as shown in the table below:

| Vertices | Coordinates (Wt %) | | |
|---|---|---|---|
| | NiO | $V_2O_3$ | $TiO_2$ |
| A | 60 | 40 | 0 |
| B | 60 | 14 | 26 |
| C | 20 | 14 | 66 |
| D | 2 | 32 | 66 |
| E | 2 | 98 | 0. |

* * * * *